United States Patent [19]

Fujito

[11] Patent Number: 5,047,864
[45] Date of Patent: Sep. 10, 1991

[54] COLORS VIDEO PRINTER WITH MONITOR FOR DISPLAYING MIXED VIDEO SIGNALS AND CHARACTER MESSAGES INDICATING PRINTER OPERATING CONDITIONS

[75] Inventor: Shogo Fujito, Kanagawa, Japan

[73] Assignee: Sony Corporation, Tokyo, Japan

[21] Appl. No.: 373,242

[22] Filed: Jun. 29, 1989

[30] Foreign Application Priority Data

Jun. 29, 1988 [JP] Japan .................... 63-161801

[51] Int. Cl.⁵ .............................. H04N 1/23
[52] U.S. Cl. .................... 358/296; 358/76; 358/450
[58] Field of Search ........... 358/296, 401, 450, 452, 358/453, 909, 302, 471, 75, 76, 78, 80, 298, 455

[56] References Cited

U.S. PATENT DOCUMENTS

| | | | |
|---|---|---|---|
| 4,641,197 | 2/1987 | Miyagi | 358/450 |
| 4,733,304 | 3/1988 | Homma | 358/453 |
| 4,769,694 | 9/1988 | Oshikoshi | 358/909 |
| 4,807,020 | 2/1989 | Hirosawa | 358/448 |
| 4,811,109 | 3/1989 | Shimizu | 358/453 |
| 4,896,208 | 1/1990 | Moriya | 358/450 |

FOREIGN PATENT DOCUMENTS

| | | |
|---|---|---|
| WO86/04758 | 8/1986 | PCT Int'l Appl. . |
| 2149997 | 6/1985 | United Kingdom . |
| 2174568 | 11/1986 | United Kingdom . |
| 2194704 | 3/1988 | United Kingdom . |
| 2215554 | 9/1989 | United Kingdom . |

*Primary Examiner*—Benjamin R. Fuller
*Assistant Examiner*—Scott A. Rogers
*Attorney, Agent, or Firm*—Hill, Van Santen, Steadman & Simpson

[57] ABSTRACT

A printing apparatus having a key apparatus for pointing a function of the printing apparatus, a printing device for printing a video signal to a printing medium, a control apparatus for generating a message character corresponding to the function pointed by the key apparatus and for generating a signal for displaying made by mixing the video signal and the message character, and a control circuit for controlling display apparatus, wherein the display apparatus are supplied with the signal for displaying and are connected to the printing apparatus as peripheral apparatus.

14 Claims, 7 Drawing Sheets

COLORS VIDEO PRINTER WITH MONITOR FOR DISPLAYING MIXED VIDEO SIGNALS AND CHARACTER MESSAGES INDICATING PRINTER OPERATING CONDITIONS

BACKGROUND OF THE INVENTION

1. Field of the Invention

The present invention relates generally to printers and, more particularly, is directed to a printing apparatus capable of printing a video signal on a printing medium.

2. Description of the Prior Art

In a prior-art color video printer, a monitor television receiver and a color video printer are connected to each other to display the printing content on a monitor television receiver. Also, various messages of the printer, namely, the operation condition of the printer and the like are transmitted to the operator by blinking LEDs (light emitting diodes) disposed on the printer or the like. For example, if a print command key on the printer is pressed, then the monitor receiver can monitor a print image signal stored in a memory provided within the printer. Upon printing, if a print key is pressed, then the print image signal stored in the memory is printed out on a printing medium, and the indication of printing operation is made by lighting the corresponding LED mounted on the printer.

According to the prior-art printing apparatus, the operator cannot check in detail the operating condition or the operation condition of the printer so that a printing sheet is ejected even by a mis-operation and the unsatisfactory loading condition of an ink ribbon and a printing sheet, thus resulting in useless printing. Further, without any knowledge on the cause of trouble, the printing apparatus has to be repaired.

OBJECTS AND SUMMARY OF THE INVENTION

It is an object of the present invention to provide an improved printing apparatus which can remove the above defects inherent in the prior-art printing apparatus.

More specifically, it is an object of the present invention to provide a printing apparatus in which a message character is displayed on a monitor screen of a display apparatus together with an image to be printed.

It is another object of the present invention to provide a printing apparatus in which the condition of a printer, mis-operation, process error and the like can be visually confirmed.

It is still another object of the present invention to provide a printing apparatus which can be simplified in arrangement.

It is still another object of the present invention to provide a printing apparatus which can be made inexpensive.

According to an aspect of the present invention, there is provided a printing apparatus comprising:
  (a) key means for commanding a function of said printing apparatus;
  (b) printing means for printing a video signal on a recording medium;
  (c) control means for generating a message character corresponding to said function pointed out by said key means and for generating a signal for displaying made by mixing said video signal and said message character; and
  (d) a control circuit for controlling the display means, wherein said display means are supplied with said signal for display and are connected to said printing apparatus as peripheral apparatus.

According to another aspect of the present invention, there is provided a printing apparatus comprising:
  (1) printing means for printing a video signal on a printing medium;
  (2) control means for detecting a change of condition of said printing apparatus and for generating a message character corresponding to said change of condition and for generating a signal for displaying made by mixing said video signal and said message character; and
  (3) a control circuit for controlling display means, wherein said display means are supplied with said signal for displaying and are connected to said printing apparatus as peripheral apparatus.

The above, and other objects, features and advantages of the present invention will be apparent in the following detailed description of a preferred embodiment of the invention when read in conjunction with the accompanying drawings, in which the same references identify corresponding parts in the several views.

BRIEF DESCRIPTION OF THE DRAWINGS

The accompanying drawings show a preferred embodiment of the present invention in which.

DETAILED DESCRIPTION OF A PREFERRED EMBODIMENT

An embodiment of a printing apparatus according to the present invention will hereinafter be described with reference to FIGS. 1 to 9.

Referring to the drawings in detail and initially to FIGS. 1 and 2, an arrangement of a printing apparatus, in particular, a color video printer in this embodiment will be described.

Figure 1:
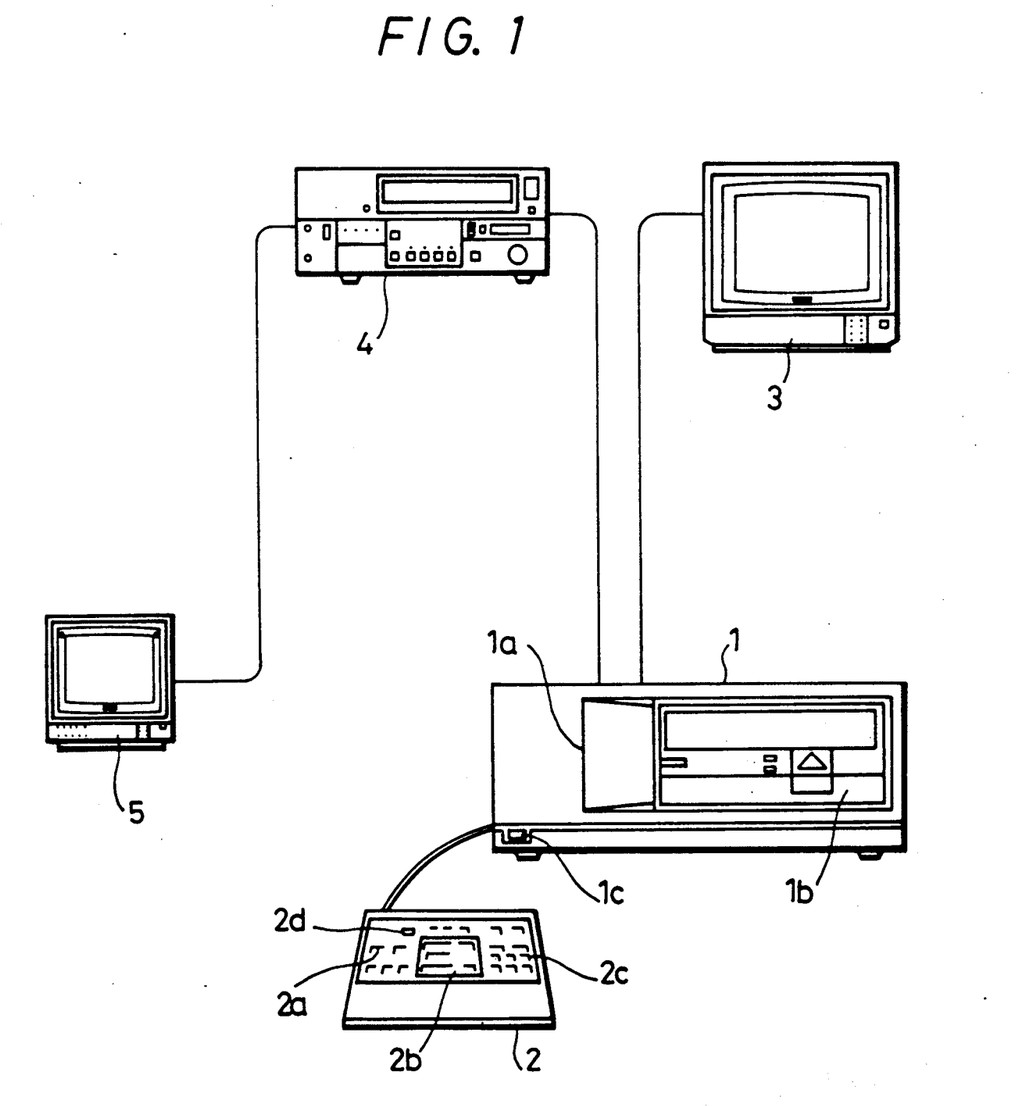
FIG. 1 is a schematic diagram showing a layout of a printing apparatus according to the present invention.

FIG. 1 shows an overall layout of the printing apparatus of the present invention.

As shown in FIG. 1, there is provided a color video printer 1 whose printing operation is controlled by a key apparatus 2. The key apparatus 2 mainly comprises an operational portion 2a related to a memory, an operational portion 2b related to a printing operation, an adjusting portion 2c for adjusting the image quality and color tone of a printed image and an input select key 2d. These portions of the key apparatus 2 will be described more fully later in association with the operation of the printing apparatus with reference to FIG. 2.

A monitor television receiver 3 is connected to the color video printer 1 so that the operator can visually confirm an image being reproduced and an image to be printed. Also, the monitor television receiver 3 is capable of displaying various message characters supplied from the color video printer 1. A signal source 4 might be a video apparatus for supplying a video signal to be printed and is connected to the color video printer 1.

The video apparatus connectable to the color video printer 1 might be a video tape recorder for generating an NTSC composite video signal, a video camera, a video disk player, a still image transmitting apparatus, a video tape recorder equipped with an S-video signal output terminal, a video tape recorder equipped with an output terminal for a component signal (color difference signals), a so-called still camera for recording a still image, a personal computer having a still image transmitting apparatus and R (red), G (green) and B (blue) signal output terminals, a still camera, a still image transmitting apparatus and the like. Another monitor television receiver 5 is connected to the video apparatus (signal source) 4 to constantly monitor an image reproduced by the video apparatus 4.

To print a video image by the thus arranged color video printer 1, open a cover 1a of the color video printer 1 and insert an ink ribbon cassette (not shown) thereinto. Then, set a printing sheet or a sheet for overhead projector (hereinafter simply referred to as an OHP) on a sheet-supply tray 1b and switch on the monitor television receiver 3 and the power switch 1c of the color video printer 1. Press the input select key 2d of the key apparatus 2 to select the input video signal. The input video signal will be then displayed on the monitor television receiver 3 and the display of the input video signal will be erased after a short period of time. When a video image you want to print appears on the monitor television receiver 3, press a memory in key $2a_1$ shown in FIG. 2. The image will be stored in the memory. Press a print key $2b_1$ on the key apparatus 2. The color video printer 1 will print a picture.

Press a memory clear key $2a_2$. The print image information stored in the memory will be cleared. To stop the printout, press a print stop key $2b_2$. Further, to select the memory video image to be printed and a video image inputted, press a input/memory select key $2b_3$.

Figure 3:
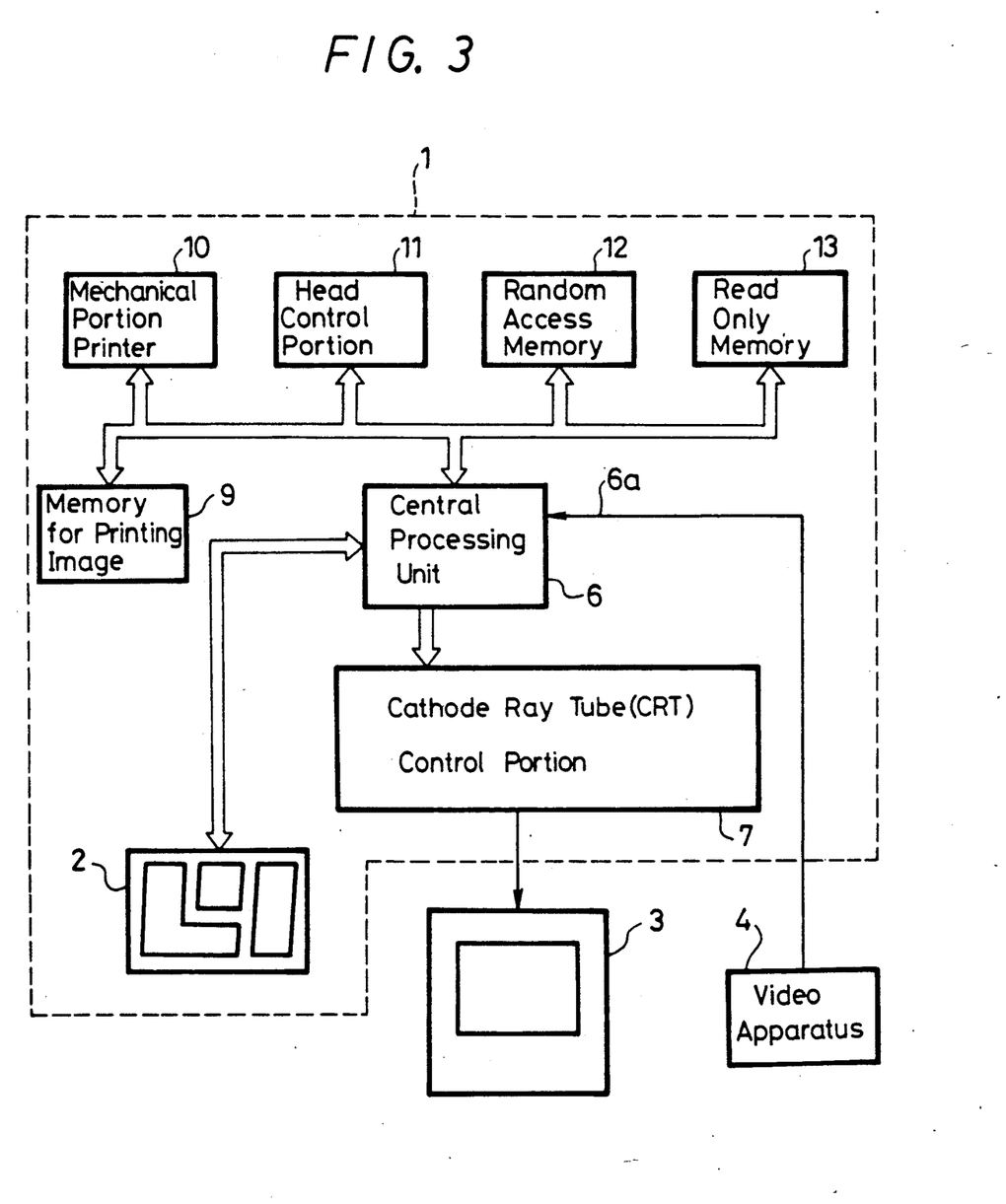
FIG. 3 is a block diagram showing an embodiment of a printing apparatus according to the present invention.

FIG. 3 is a block diagram showing an embodiment of the printing apparatus according to the present invention.

Referring to FIG. 3, it will be seen that the printing apparatus formed of, for example, the color video printer 1, is comprised of the key apparatus 2, a microcomputer (central processing unit) 6, memories such as a random access memory (RAM) 12, a read only memory (ROM) 13, a mechanical portion 10 provided as printing means for the color video printer 1, a head control portion 11, a memory 9 for a printing video image and a cathode ray tube (CRT) control portion 7.

The memory 9 might be served as the random access memory 12.

A video image signal from the video apparatus 4 is inputted to inputting means 6a such as an input interface of the microcomputer 6, and is also supplied to the microcomputer 6. A display output from the microcomputer 6 is supplied through the CRT control portion 7 to the monitor television receiver 3, whereby the input video image signal or the video image signal stored in the memory 9 for a printing image is displayed on the cathode ray tube of the monitor television receiver 3.

The microcomputer 6 is connected to the memory 9, the mechanical portion 10, the head control portion 11, the RAM 12, the ROM 13, the key apparatus 2 and the CRT control portion 7 via a data bus or a control bus.

In this embodiment, the microcomputer 6 supplies various message character signals through the CRT control portion 7 to the monitor television receiver 3, thereby displaying various message characters on the monitor screen of the monitor receiver 3. If the operator presses a suitable key on the key apparatus 2 in accordance with the display on the monitor screen, the message character signal corresponding to the pressed key is supplied from the microcomputer 6 to the CRT control portion 7 and the corresponding message character is displayed on the monitor receiver 3 under the control of the CRT control portion 7. Simultaneously, the microcomputer 6 supplies control signals to the respective portions so that they execute the commands issued from the microcomputer 6.

The printing apparatus of this embodiment can execute various operations such as obtaining a full printed video image and can display the same. Of various operations and displays that the printing apparatus of the invention can effect, some of them will be typically represented in the flow charts forming FIGS. 4, 6, 7, 8 and 9 and in a pictorial representations forming FIGS. 5A and 5B.

Figure 4:
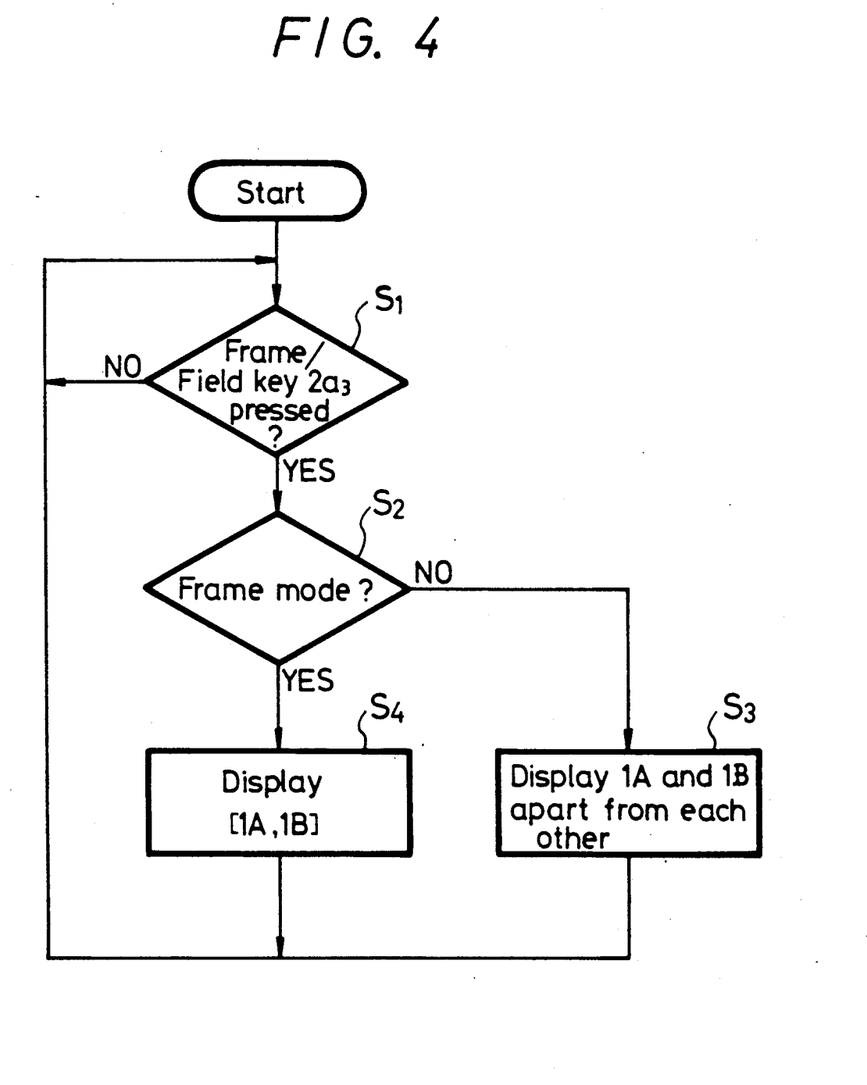
FIG. 4 is a flow chart to which reference will be made in explaining the operation for selectively displaying a frame or field picture.

The frame or field selecting display operation is represented in the flow chart of FIG. 4. When a video signal of a quick motion picture is stored so as to be printed in the form of full-size picture, it is frequently observed that a video image is displaced. To avoid this defect, press a frame/field key $2a_3$ shown in FIG. 2. The frame mode will be changed to the field mode so that the picture on the screen of the monitor receiver 3 is stopped from being displaced. The memory 9 for printing a video image shown in FIG. 3 has a capacity capable of storing a video image of at least one frame, wherein the memory 9 can be selectively operated to display one picture screen or to display half-divided picture screens by pressing the frame/field key $2a_3$.

Figure 2:
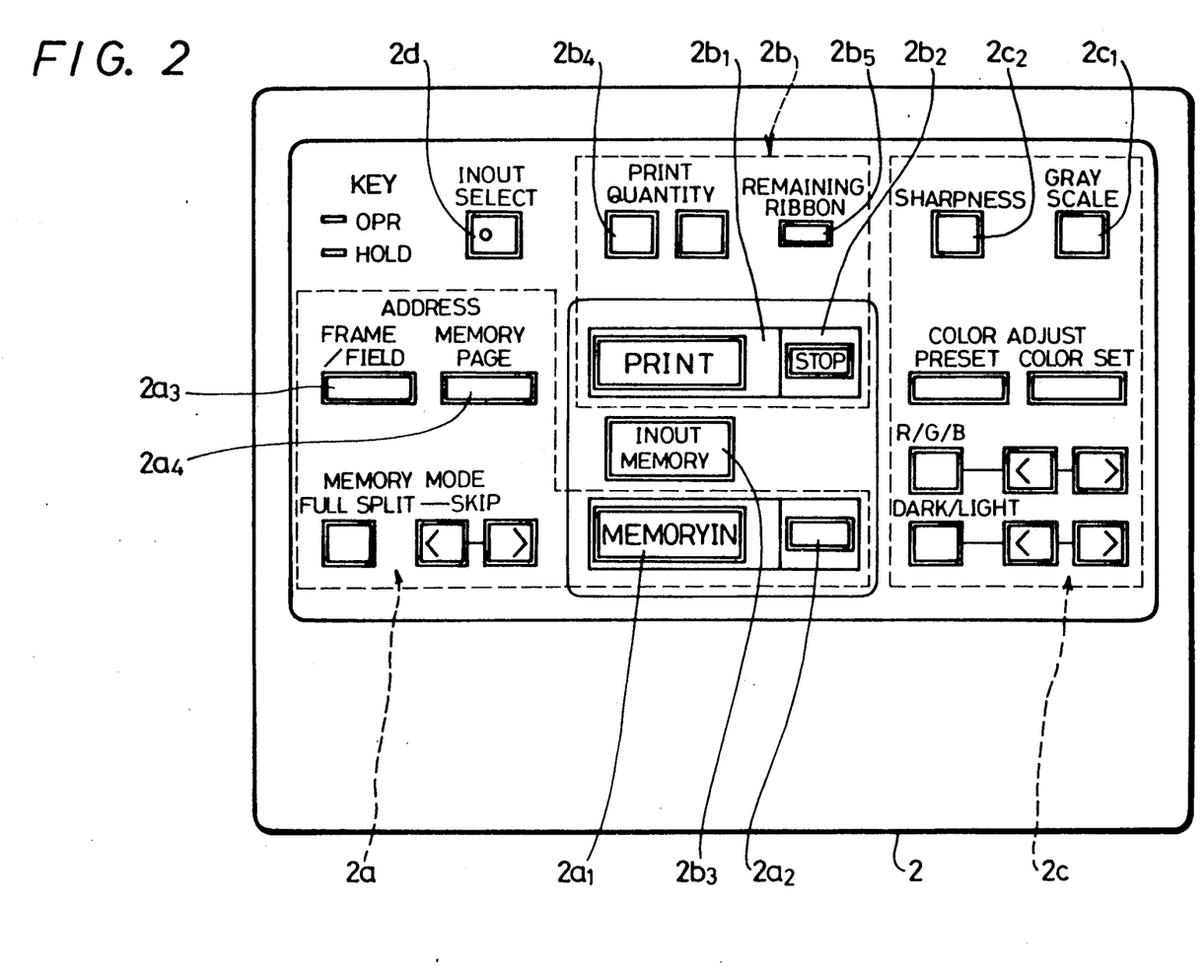
FIG. 2 is a schematic plan view of an operational panel of a key apparatus used in the printing apparatus of the present invention.

Let us now explain the operation in which the frame/field key $2a_3$ on the key apparatus 2 shown in FIG. 2 is pressed with reference to FIG. 4.

Referring to FIG. 4, following the Start of the operation, it is determined by the microcomputer 6 (shown in FIG. 3) at step S1 whether the frame/field key $2a_3$ is pressed. If it is determined that the key $2a_3$ is not pressed as represented by a NO at first step S1, the routine returns to step S1. If it is determined that the key $2a_3$ is pressed as represented by a YES at step S1, the routine proceeds to second step S2. In step S2, it is determined by the microcomputer 6 whether the present mode is the frame mode. If it is determined that the present mode is not the frame mode as represented by a NO at step S2 the microcomputer 6 supplies a control signal through the CRT control portion 7 to the monitor receiver 3 so that the monitor receiver 3 displays on the lower end portion of its screen symbols 1A and 1B representing the first field mode and the second field mode, or representing the memory pages apart from each other, as represented at third step S3.

If on the other hand it is determined that the present mode is the frame mode as represented by a YES at step S2, the routine proceeds to fourth step S4, whereat the symbols 1A and 1B are displayed close to each other as [1A 1B]. After the third and fourth steps S3 and S4, the routine returns to the first step S1.

Figure 5A:
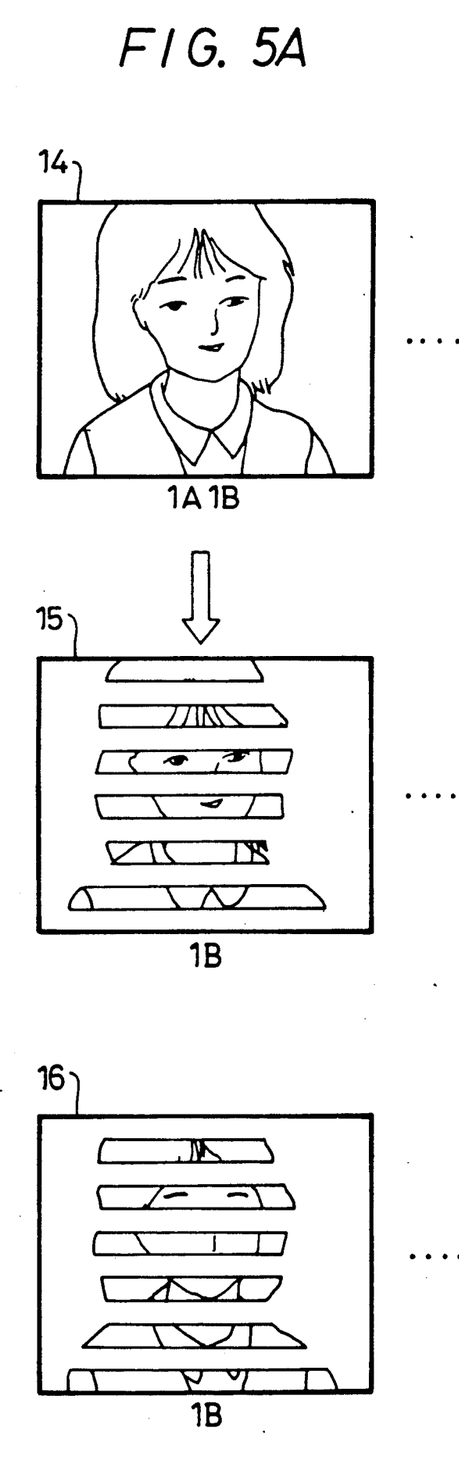
FIGS. 5A and 5B are front views of a cathode ray tube and illustrate examples of video images displayed thereon.
Figure 5B:
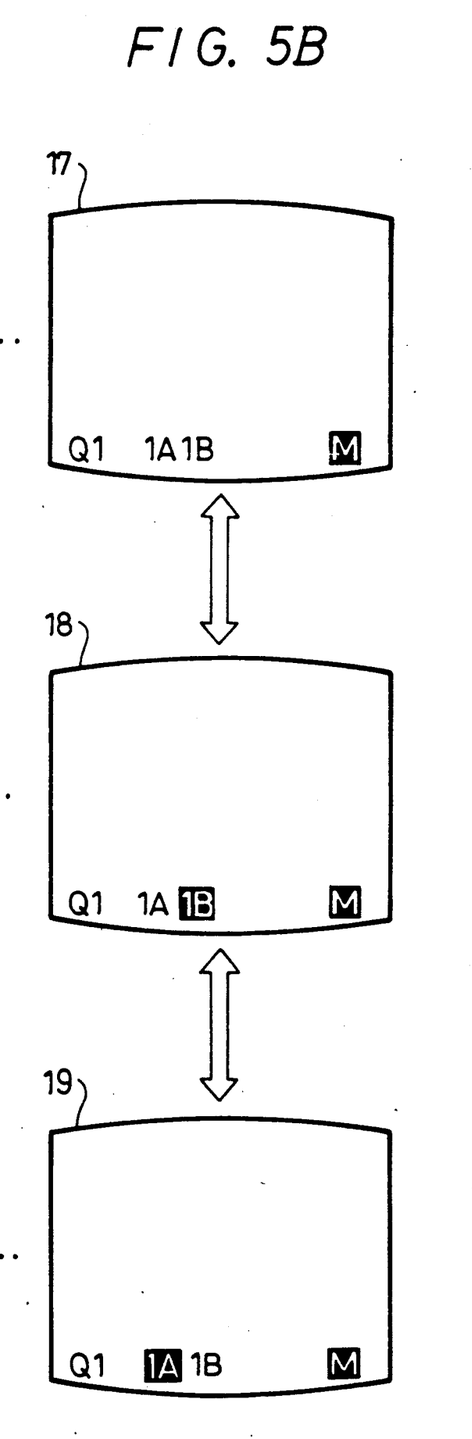

FIG. 5A schematically illustrates examples of a frame mode video image 14 stored in the memory 9 and video images 15 and 16 of first and second field modes. FIG. 5B illustrates examples in which a picture 17 represents that the symbols 1A and 1B are displayed close to each other as [1A 1B] in the frame mode picture 14, and pictures 18 and 19 represent pictures that the symbols 1A and 1B are displayed as [1A 1B] in the first and second field modes 15 and 16.

In order to select either the first field mode 15 or the second field mode 16 in FIG. 5B, press a memory page key $2a_4$ shown in FIG. 2. The memory page printed is encircled by a square block in FIG. 5B. This memory page block is displayed in red if the field mode is selected, and it is blinked during the printout. In FIG. 5B, [Q1] represents the number of video images to be printed. To print, for example, five video images, press a plus key of a print quantity key $2b_4$ shown in FIG. 2 five times. The page number display on the monitor receiver 3 is sequentially increased as [Q1, Q2, Q3, Q4 and Q5]. To press a minus key of the print quantity key $2b_4$, the page number display is sequentially decreased. In FIG. 5B, a character "M" represents an image stored in the printing image memory 9 and which represents [I] when an input image is derived from the video apparatus.

Figure 6:
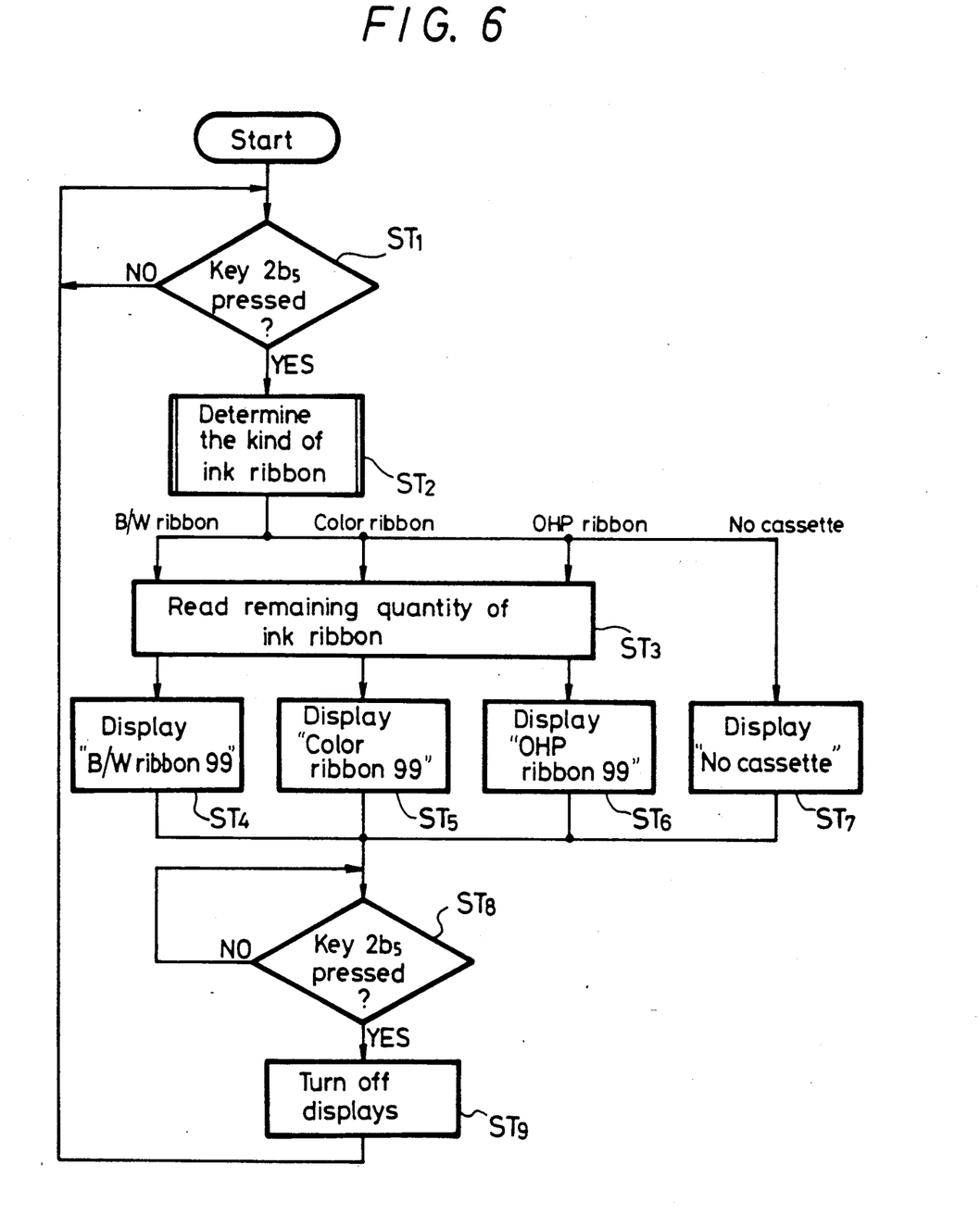
FIG. 6 is a flow chart to which reference will be made in explaining the operation for displaying a remaining quantity of an ink ribbon.

FIG. 6 is a flow chart to which reference will be made in explaining the operation of displaying the remaining condition of an ink ribbon.

When the cover 1a shown in FIG. 1 is opened, the ink ribbon cassette is inserted and one printing is made, the condition of the ink ribbon is displayed. More specifically, while a remaining ribbon key $2b_5$ is being pressed, the monitor receiver 3 displays the kind of ink ribbon and the remaining quantity of the ink ribbon. For example, if the ink ribbon is the color ink ribbon and the remaining quantity of the color ink ribbon is 99, [COLOR RIBBON 99] is displayed on the center of the CRT of the monitor receiver 3.

Referring to FIG. 6, following the Start of the operation, it is determined at first step $ST_1$ by the microcomputer 6 whether the remaining ink ribbon key $2b_5$ is pressed. If a NO is output at step $ST_1$, the step $ST_1$ is repeated. If it is determined that the key $2b_5$ is pressed as represented by a YES at step $ST_1$, the routine proceeds to second step $ST_2$. In step $ST_2$, the kind of the ink ribbon is determined. The three kinds of ink ribbons such as a black and white ink ribbon, a color ribbon and an OHP ink ribbon are available and in addition, a case where any ink ribbon is not available is also taken into consideration. The microcomputer 6 can selectively determine these four cases. If the ink ribbon is inserted into the cover 1a, the remaining quantity of each of the black and white ink ribbon, the color ink ribbon and the OHP ink ribbon is read out from the memory at third step $ST_3$. If the ink ribbon is the black and white ink ribbon, [B/W RIBBON 99] is displayed on the center of the CRT of the monitor receiver 3 as represented at fourth step $ST_4$. If it is the color ink ribbon, [COLOR RIBBON 99] is displayed on the center of the CRT of the monitor receiver 3 as represented at step $ST_5$. If it is the OHP ribbon, [OHP RIBBON 99] is similarly displayed as represented at sixth step $ST_6$. If the ink ribbon cassette is not loaded into the cover 1a, [NO CASSETTE] is displayed on the center of the CRT of the monitor receiver 3 as represented at seventh step $ST_7$. After these predetermined displays are made, it is determined at eighth step $ST_8$ by the microcomputer 6 whether the remaining ink ribbon key $2b_5$ is pressed. If a NO is output at the step $ST_8$ is repeated. If it is determined that the key $2b_5$ is pressed as represented by a YES at step $ST_8$, the routine proceeds to ninth step $ST_9$. In step $ST_9$, each of the above-mentioned displays on the CRT of the monitor receiver 3 is turned off, and the routine returns to step $ST_1$.

In FIG. 2 which will be explained hereinunder with reference to the flow charts of FIGS. 7 and 8, reference numeral $2c_1$ designates a gray scale key disposed within the adjusting portion 2c which adjusts the image quality and color tone of a printing image. The gray scale key $2c_1$ is used to adjust color of the image to be printed and color of the CRT of the monitor receiver 3. By pressing a sharpness key $2c_2$, it is possible to sequentially switch the image quality of the printing picture to [L](low level), [M] (medium level) and [H](high level). If the image quality of the printing picture is [L], the contour of the image is blurred. If on the other hand it is H, the contour of the printing picture is emphasized. If it is [M], the printing picture is arranged to have a medium level.

Figure 7:
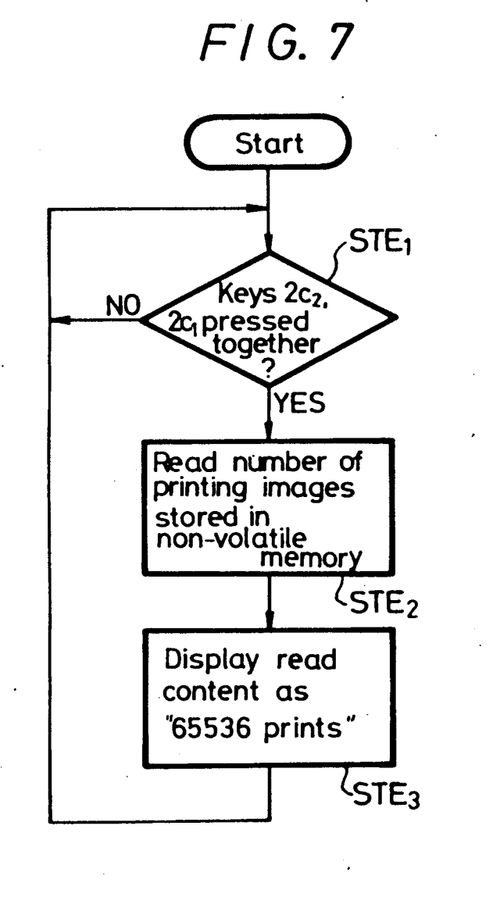
FIG. 7 is a flow chart to which reference will be made in explaining the operation for displaying the number of printing sheets.
Figure 8:
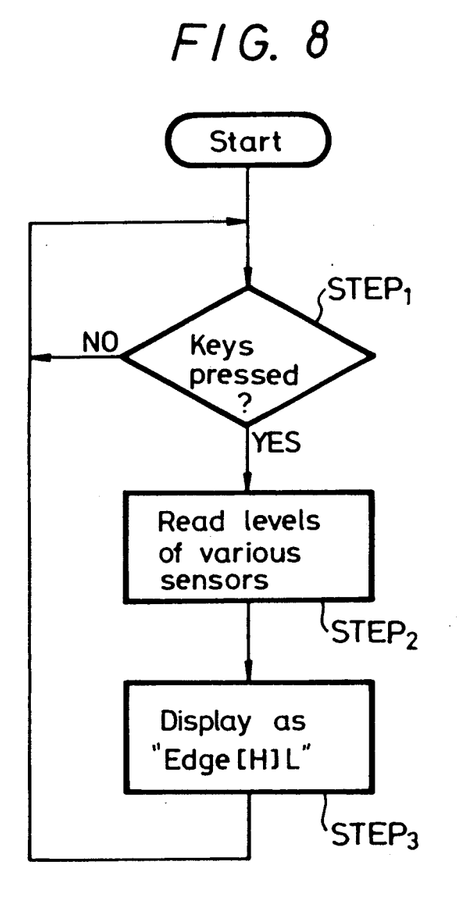
FIG. 8 is a flow chart to which reference will be made in explaining the operation for displaying a sensor level.
Figure 9:
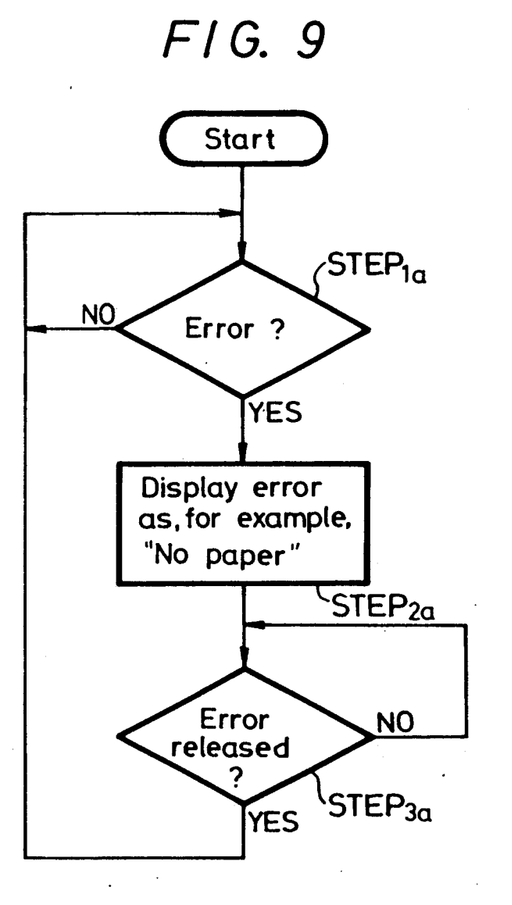
FIG. 9 is a flow chart to which reference will be made in explaining the operation for displaying various errors.

The flow charts shown in FIGS. 7 to 9 each illustrates a mode in which a serviceman repairs the printer. FIG. 7 is a flow chart used to explain the operation in which the number of the printing image is indicated. In this case, the corresponding operation keys are not provided on the keyboard shown in FIG. 2. At first step $STE_1$ in FIG. 7, when the sharpness key $2c_2$ and the gray scale key $2c_1$ are pressed simultaneously, the message characters indicating the number of the printing images are displayed on the CRT of the monitor receiver 3. Referring to FIG. 7, it is determined at step $STE_1$ by the microcomputer 6 whether the sharpness key $2c_2$ and the gray scale key $2c_1$ are pressed simultaneously. If they are not pressed simultaneously as represented by a NO at step $STE_1$, the routine returns to step $STE_1$. If a YES is output at step $STE_1$, the routine proceeds to second step $STE_2$ in which the number of the printing images stored in the non-volatile memory is read out. Then, at the next step $STE_3$ the thus read out number of the printing images is supplied through the CRT control portion 7 to the monitor receiver 3 so that the monitor receiver 3 displays the total number of the printing images on its CRT as [65536 PRINTS].

FIG. 8 is a flow chart used to explain the operation in which the levels of various sensors used in the printer are indicated. Similarly to FIG. 7, it is determined at step $STEP_1$ by the microcomputer 6 whether two predetermined keys (not shown) are pressed simultaneously. If the two keys are not pressed simultaneously as represented by a NO at step $STEP_1$, the routine returns to step $STEP_1$. If a YES is output at step $STEP_1$, the routine proceeds to second step $STEP_2$. At step $STEP_2$, the levels of various sensors are read out, and the thus read out levels of the sensors are displayed on the monitor receiver 3 via the CRT control portion 7. Data to be displayed are the name of sensor, whether the fundamental characteristic of the sensor is "H" (high level) or "L" (low level), whether the present polarity is "H" or "L" and the like. For example, the data is displayed as [EDGE "H" L), as represented at third step STEP3.

In this way, the levels of various sensors can be monitored without any help of a measuring apparatus. The flow chart of FIG. 9 shows the operation in which various errors are indicated on the CRT of the monitor receiver 3. Various error displays are available, in which END OF RIBBON] announces the ink ribbon is fully consumed, [INSERT RIBBON] announces that the ink ribbon cassette is not correctly inserted into the cover 1a, [FEED ERROR]announces that the printing sheet is not fed correctly, INSERT TRAY) announces that the sheet feed tray is not correctly inserted into the cover 1a, NO INPUT] announces that no signal is inputted from the selected input video signal source, [PLEASE WAIT]announces that the printing sheet is still in the tray, [PROCESS ERROR]announces that the supply of the printing sheet is troubled, [RIBBON ERROR]announces that the ink ribbon is cut or entangled, TURN PAPER OVER]announces that the printing sheet is inserted into the tray upside-down, NO PAPER]announces that the printing sheets have to be supplied, etc.

Referring to FIG. 9, it is determined at first step STEP$_{1a}$ by the microcomputer 6 whether an error occurs in the various sensors. If a NO is output at step STEP$_{1a}$, the routine returns to step STEP$_{1a}$. If it is determined that the error occurred in the sensor as represented by a YES at step STEP$_{1a}$, the routine proceeds to second step STEP$_{2a}$, in which an error indication corresponding to the error, for example, when the printing sheet has to be supplied, [NO PAPER]is displayed on the CRT of the monitor receiver 3 by the microcomputer 6 via the CRT control portion 7. Then, it is determined at third step STEP$_{3a}$ by the microcomputer 6 whether various errors are released. If a NO is output at step STEP$_{3a}$, the routine returns to step STEP$_{3a}$. If on the other hand a YES is output at step STEP$_{3a}$, the routine returns to step STEP$_{1a}$.

As described above, the error condition is displayed and can be monitored by the user so that the user can cope with the errors occurred without delay.

According to the color printing apparatus of the present invention, the kinds of the input image signal, for example, a NTSC composite signal, a component signal or a RGB signal can also be displayed and the color adjustment on the monitor screen can be displayed.

While the display method in the above-mentioned embodiment is described by way of example, it is needless to say that message characters and the like can be displayed on the CRT of the monitor receiver 3 by various methods.

According to the printing apparatus of the present invention, since various message characters for the operator are displayed on the screen of the monitor receiver on which the image to be printed is displayed, various communications are made between the printing apparatus and the operator very smoothly. Thus, the printing apparatus becomes very useful in practice. Further, since the printing apparatus of the present invention does not need display device such as a light emitting diode (LED) or the like, the printing apparatus of the present invention can be simplified in arrangement and made inexpensive from a money standpoint.

It should be understood that the above description is presented by way of example on a single preferred embodiment of the invention and it will be apparent that many modifications and variations could be effected by one skilled in the art without departing from the spirit and scope of the novel concepts of the invention so that the scope of the invention should be determined only by the appended claims.

I claim as my invention:

1. A printing apparatus comprising:
  (a) key means for selecting a function of said printing apparatus;
  (b) printing means for printing a video signal on a recording medium, wherein a peripheral video apparatus connected to said printing apparatus and supplies said video signal to said printing apparatus;
  (c) memory means for storing said video signal which is supplied from said video apparatus;
  (d) control means for generating a message character corresponding to said function selected by said key means and for generating a display signal formed by mixing said video signal and said message character;
  (e) a control circuit for controlling a peripheral display apparatus which is supplied with said display signal and which is connected to said printing apparatus; and
  (f) said control means supplies the mixed signal comprising said video signal and said message character to said control circuit and supplies said video signal to said printing means.

2. A printing apparatus according to claim 1, wherein said key means includes a print key and when said print key is operated, said video signal in said memory means is transmitted to said printing means.

3. A printing apparatus according to claim 1, wherein said key means includes a memory in key and when said memory in key is operated, a video signal displayed on said display means is stored in said memory means.

4. A printing apparatus according to claim 1, wherein said key means includes a memory clear key and when said memory clear key is operated, said video signal stored in said memory means is cleared.

5. A printing apparatus comprising:
  (a) key means for selecting a function of said printing apparatus;
  (b) printing means for printing a video signal on a recording medium;
  (c) control means for generating a message character corresponding to said function selected by said key means and for generating a display signal made by mixing said video signal and said message character;
  (d) a control circuit for controlling a peripheral display apparatus wherein said display apparatus is supplied with said display signal and is connected to said printing apparatus;
  (e) memory means for storing said video signal supplied from a peripheral video apparatus;
  (f) said key means includes a print quantity key for determining a quantity of printing sheets on which to print said video signal stored in said memory means, wherein when said key is operated, said control means generates a message character corresponding to said quantity of printing sheets determined by said print quantity key.

6. A printing apparatus comprising:
(a) key means for selecting function of said printing apparatus;
(b) printing means for printing a video signal on a recording medium;
(c) control means for generating a message character corresponding to said function selected by said key means and for generating a display made by mixing said video signal and said message character;
(d) a control circuit for controlling a peripheral display apparatus wherein said display apparatus is supplied with said display signal and is connected to said printing apparatus;
(e) said printing means including a printing head and an ink ribbon;
(f) said key means including a key for requesting an indication on the condition of said ink ribbon, wherein when said key is operated, said control means generates a message character corresponding to a condition of said ink ribbon.

7. A printing apparatus comprising:
(a) (a) key means for selecting function of said printing apparatus;
(b) printing means for printing a video signal on a recording medium;
(c) control means for generating a message character corresponding to said function selected by said key means and for generating a display made by mixing said video signal and said message character;
(d) a control circuit for controlling display means, wherein said display means are supplied with said display signal and is connected to said printing apparatus;
(e) said key means including a key for adjusting said video signal transmitted to said printing means, wherein when said key is operated, said control means generates a message character corresponding to an adjusted condition of said video signal.

8. A printing apparatus comprising:
(1) printing means for printing a video signal on a printing medium;
(2) control means for detecting a change of condition of said printing apparatus and for generating a message character corresponding to said charge of condition and for generating a display signal made by mixing said video signal and said message character; and
(3) a control circuit for controlling a peripheral display means, wherein said display means is supplied with said display signal and is connected to said printing apparatus.

9. A printing apparatus according to claim 8, further comprising a frame memory for storing a video signal supplied from a peripheral video apparatus.

10. A printing apparatus according, to claim 9, further comprising a key means for selecting a function of said printing apparatus.

11. A printing apparatus according to claim 9, wherein said control means determines whether said video signal output from said frame memory is either a field video signal or a frame video signal and generates a message character corresponding to a determined result.

12. A printing apparatus according to claim 10, wherein said key means includes a key for selecting a pattern in which a video signal output from said frame memory is either a field video signal or a frame video signal and said control means generates a message character corresponding to a pattern of said video signal selected by said key for selecting a video signal.

13. A printing apparatus according to claim 12, wherein when said printing means prints said video signal, said message character corresponding to a pattern of said video signal is blinked.

14. A printing apparatus according to claim 8, wherein said control means detects an error relating to a condition of said printing apparatus and generates a message character corresponding to said error.

* * * * *